United States Patent Office 3,278,485
Patented Oct. 11, 1966

3,278,485
NON-IONIC ORGANOPOLYSILOXANES
David Brereton Morgan and Edward Jervis Vickers, Manchester, England, assignors to Imperial Chemical Industries Limited, London, England, a corporation of Great Britain
No Drawing. Filed Mar. 20, 1964, Ser. No. 353,583
Claims priority, application Great Britain, Mar. 25, 1963, 11,696/63
10 Claims. (Cl. 260—46.5)

This invention relates to new organopolysiloxanes and to processes for the manufacture of said compounds.

Thus according to the present invention there are provided new non-ionic organopolysiloxanes containing at least one unit of the general formula:

wherein X stands for an organic radical containing the group

and wherein each of the atoms attached to the nitrogen atom in the group

is a polyvalent atom.

The non-ionic organopolysiloxanes of the present invention may be linear, branched or cyclic polysiloxanes containing at least one unit of the above general formula.

Examples of such non-ionic organopolysiloxanes include compositions having the general formulae:

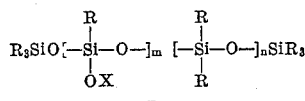 (I)

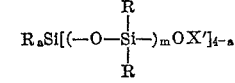 (II)

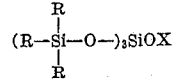 (III)

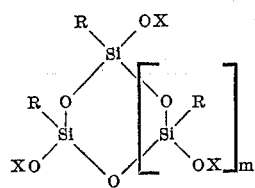 (IV)

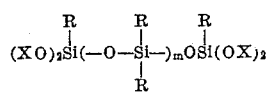 (V)

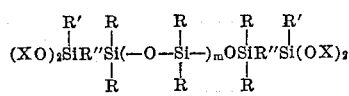 (VI)

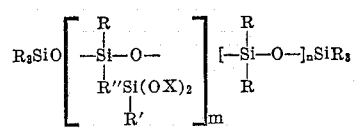 (VII)

wherein X is as above defined, R stand for a hydrocarbon radical, X' stands for X, a hydrocarbon radical, or the grouping —SiR$_3$, at least one X' being X, R' stands for —OX or a hydrocarbon radical, R" is a divalent hydrocarbon radical, $m$ is an integer, $n$ is zero or an integer and $a$ is an integer 2, 3 or 4.

Especially useful polysiloxanes are those of the general formulae:

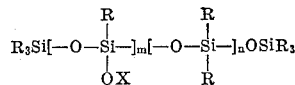

or

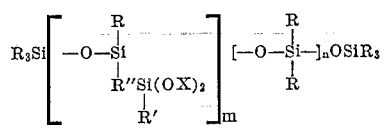

wherein R stands for a hydrocarbon radical, X is as above defined, R' stands for —OX or a hydrocarbon radical, R" is a divalent hydrocarbon radical, $m$ is an integer and $n$ is zero or an integer and the sum of $n$ and $m$ is between 10 and 50.

Particularly useful polysiloxanes are those where $m$ is between 3 and 18.

In the organo polysiloxanes of the present invention and in the general formulae given above, R may be any monovalent hydrocarbon radical, R may represent different hydrocarbon radicals in the same formula.

Examples of the hydrocarbon radical R include among others straight or branched chain alkyl radicals which may be saturated or unsaturated, cycloalkyl radicals, aryl radicals and arylalkyl radicals.

Illustrative examples of such hydrocarbon radicals include methyl, ethyl, propyl, butyl, butenyl, octyl, octadecyl, cyclohexyl, phenyl, tolyl, benzyl and phenylethyl radicals.

The organic radical X in the organopolysiloxanes of the present invention may be any organic radical which contains the group

wherein each of the atoms attached to the nitrogen in the said group is a polyvalent atom.

Polyvalent atoms which may be attached to the nitrogen atom in the group

include for example, carbon, nitrogen, oxygen and sulphur. Preferred non-ionic polysiloxanes are those in which the polyvalent atoms attached to the nitrogen atom in the group

are carbon or nitrogen atoms.

The organic radical X containing the group

may be aliphatic in character, aromatic or may be heterocyclic. The group

wherein each of the atoms attached to the nitrogen atom is a polyvalent atom is present in a considerable number of types of organic radical derived from organic nitrogeneous compounds possessing the above group in their structure. Thus the radical may be derived from an amide, an imide, a carbamate, a hydrazide or a urea, which compounds may be cyclic or linear and may be monomeric or polymeric; if polymeric it is preferred that the polymer be of low molecular weight and non-crystalline. Alternatively the radical containing the group

may be derived from a heterocyclic compound such as an acyl piperidine, an acyl morpholine, an acyl pyrazole, a mono- or diacylpiperazine, a 2-pyrrolidone, a 2-piperidone, a 3-morpholinone, a caprolactam derivative, a 2-oxazolidone, a tetrahydro-1,3-oxazine-2-one, a 2-iminazolidone, a hexahydropyrimidine-2-one, a 5-pyrazolone, a 3-pyrazolone, a tetrahydropyridazine-6-one, a hexahydropyridazine-3,6-dione, a 2,5-diketopiperazine, a hydantoin, a hydrouracil, a phthalimidine, an oxindole, or a quinazolone.

In the latter cases the C and N atoms of the

group form part of a heterocyclic ring.

The heterocyclic ring in which the C and N atoms of the group

form part of the ring may be joined to the remainder of the polysiloxane by a divalent radical Z attached by a single valency to the N atom of the

group and joined to silicon through an oxygen atom.

The divalent radical Z being a divalent hydrocarbon radical on a divalent hydrocarbon radical which is substituted by radicals such as —O—, —COO—, —NR—, or —OR.

Thus as examples of the types of organic radical X containing the group

there may be mentioned those radicals of the general formula set forth below:

(a) Carbamate containing radicals such as—

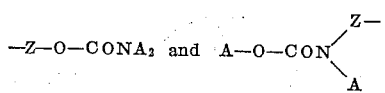

(b) Amide radicals such as—

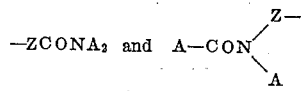

(c) Urea radicals such as—

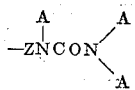

(d) Hydrazide radicals such as—

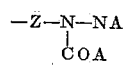

(e) 2-pyrrolidone, 2-piperidone, 3-morpholinone and caprolactam radicals such as—

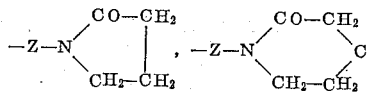

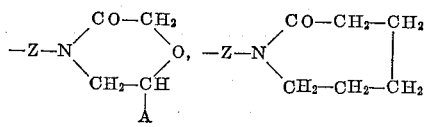

(f) 2-oxazolidone and tetrahydro-1,3-oxazine-2-one radicals such as—

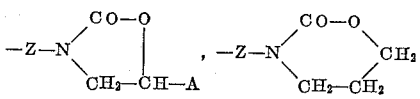

(g) 2-iminazolidone and hexahydropyrimidine-2-one radicals such as—

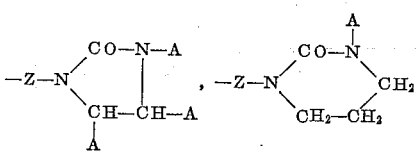

(h) 5-pyrazolene, 3-pyrazolidone and tetrahydropyridazine-6-one radicals such as—

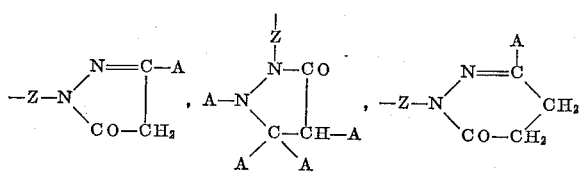

(i) Hydantoin, hydrouracil, 2,5-diketopiperazine, and hexahydropyridazine-3,6-dione radicals such as—

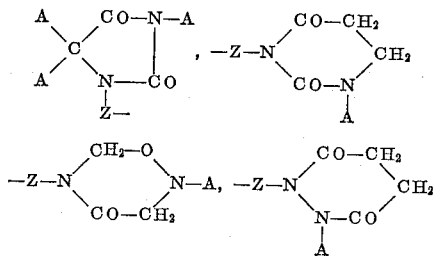

(j) Phthalimidine, oxindole and quinazolone radicals such as—

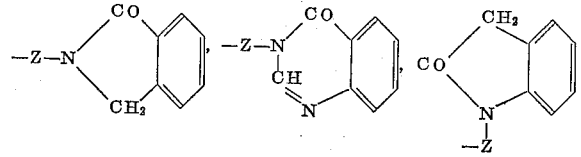

(k) Imide radicals such as—

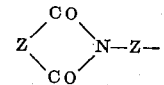

wherein A stands for hydrogen or a hydrocarbon radical which may be substituted by monovalent or divalent radicals such as —O—, —COO—, —NR—, —OR(R being a hydrocarbon radical) or additional —CON< containing groups, and —NA₂ may constitute a heterocyclic ring structure such as piperidine, morpholine or pyrazole; and Z stands for a divalent hydrocarbon radical which may similarly be substituted.

As specific examples of the groups of radicals designated above as illustrative of the organic radical X there may be mentioned the following under the respective group headings (a)–(k)—

(a)

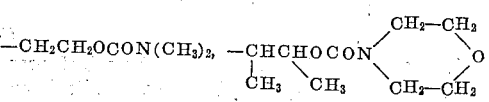

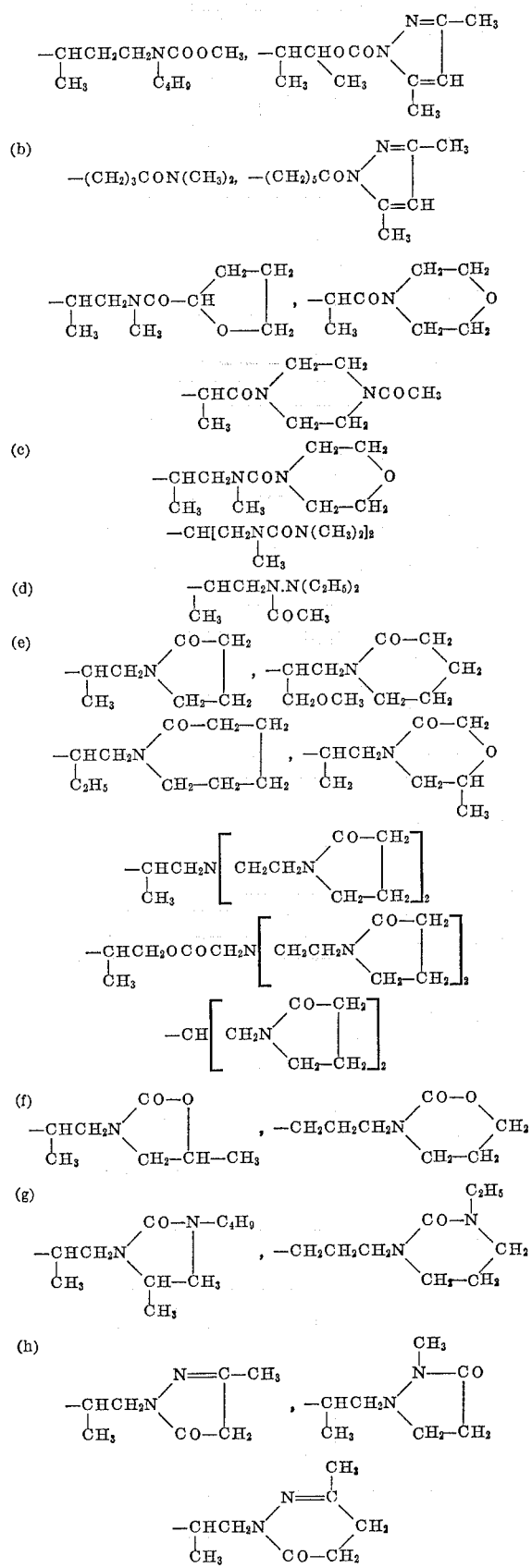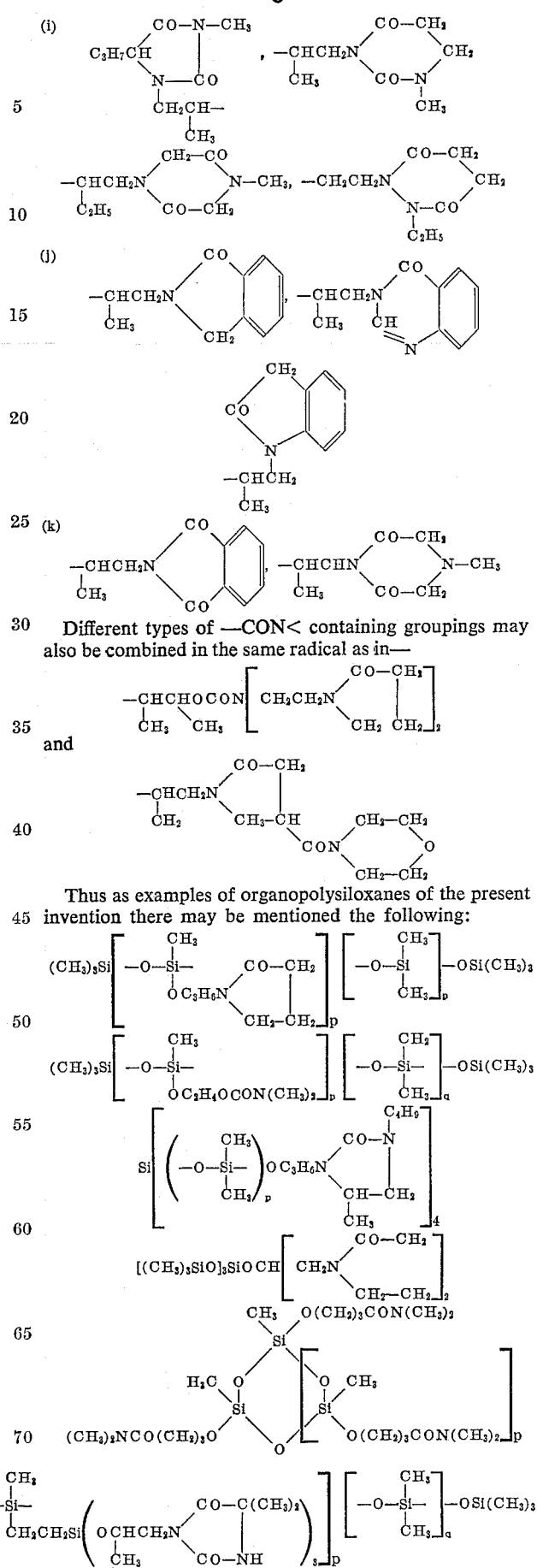

wherein p and q are integers and wherein the copolymers of the units indicated in the brackets in the first two formulae and the last may be random or block copolymers.

The organopolysiloxanes of the present invention are particularly useful as surface-active additives for use in processes employing propylene oxide polymers. Particularly valuable products are obtained when the organopolysiloxane contains, in addition to —CON< containing groupings, additional groupings which are more lyophilic to propylene oxide polymers. Suitable lyophilic groups include aromatic hydrocarbon residues such as phenyl or phenylene and also higher molecular weight aliphatic or alicylic hydrocarbon residues which may be substituted, if desired, by monovalent or divalent radicals such as —O—, —COO—, —NR—, or —OR, R being a hydrocarbon radical. The additional lyophilic groups may be in the same radical containing the —CON< groupings, or may be separately attached to other silicon atoms in the organopolysiloxane.

As specific examples of organic radicals designated by X which contain both a —CON< grouping and a more lyophilic grouping there may be mentioned the following:

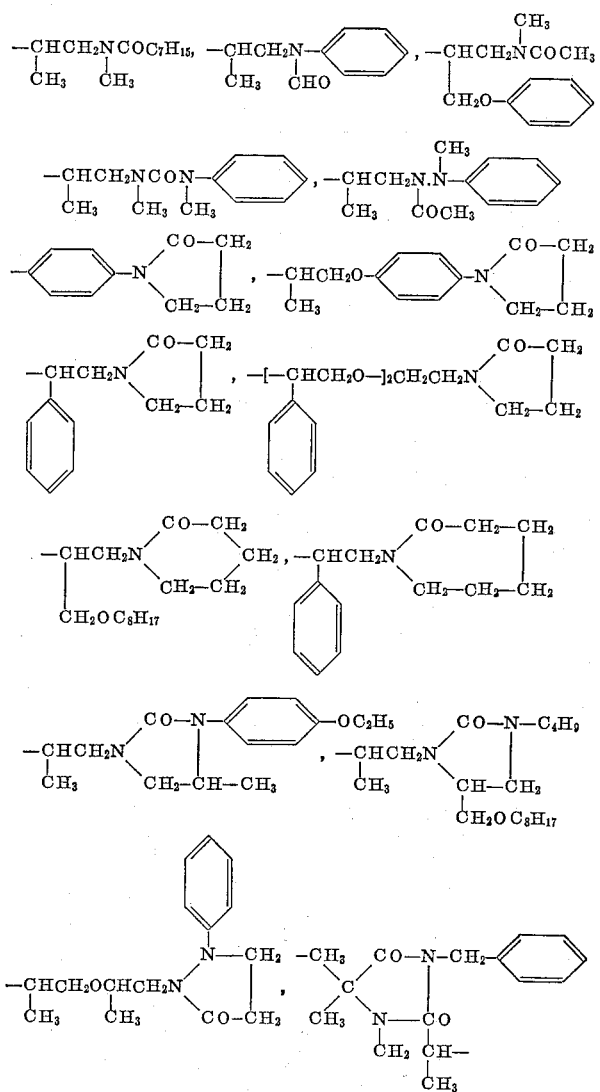

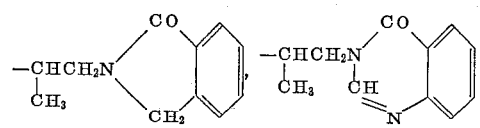

If the lyophilic group is separately attached to other silicon atoms in the organopolysiloxane, then this may be a medium, or long-chain aliphatic hydrocarbon radical, an alicyclic hydrocarbon radical, or an aromatic hydrocarbon radical, for example, in Formula I–VII R may be wholly or in part a lyophilic hydrocarbon radical such as octyl, octadecyl, cyclohexyl, phenyl, benzyl, phenylethyl.

Other lyophilic residues besides hydrocarbon residues may also be attached to silicon atoms in the organopolysiloxane.

Thus the organopolysiloxanes of the present invention are not limited to compounds containing only hydrocarbon radicals and the group OX attached to silicon atoms but also include compounds in which some of the silicon atoms carry groups other than the group OX or hydrocarbon radicals.

Thus a particular group of organopolysiloxanes is that group of compounds in which in addition to at least one unit of the general formula:

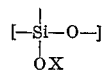

there is also present a unit of the general formula:

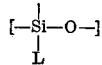

wherein L is a lyophilic group.

As examples of suitable lyophilic groups designated by L, other than the aforementioned hydrocarbon radicals there may be mentioned the following:

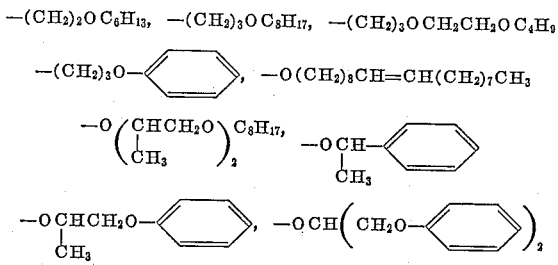

and

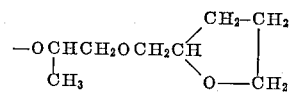

Thus as further examples of the organopolysiloxanes of the present invention there may be mentioned compounds of the following general formulae:

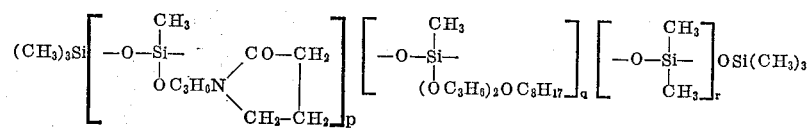

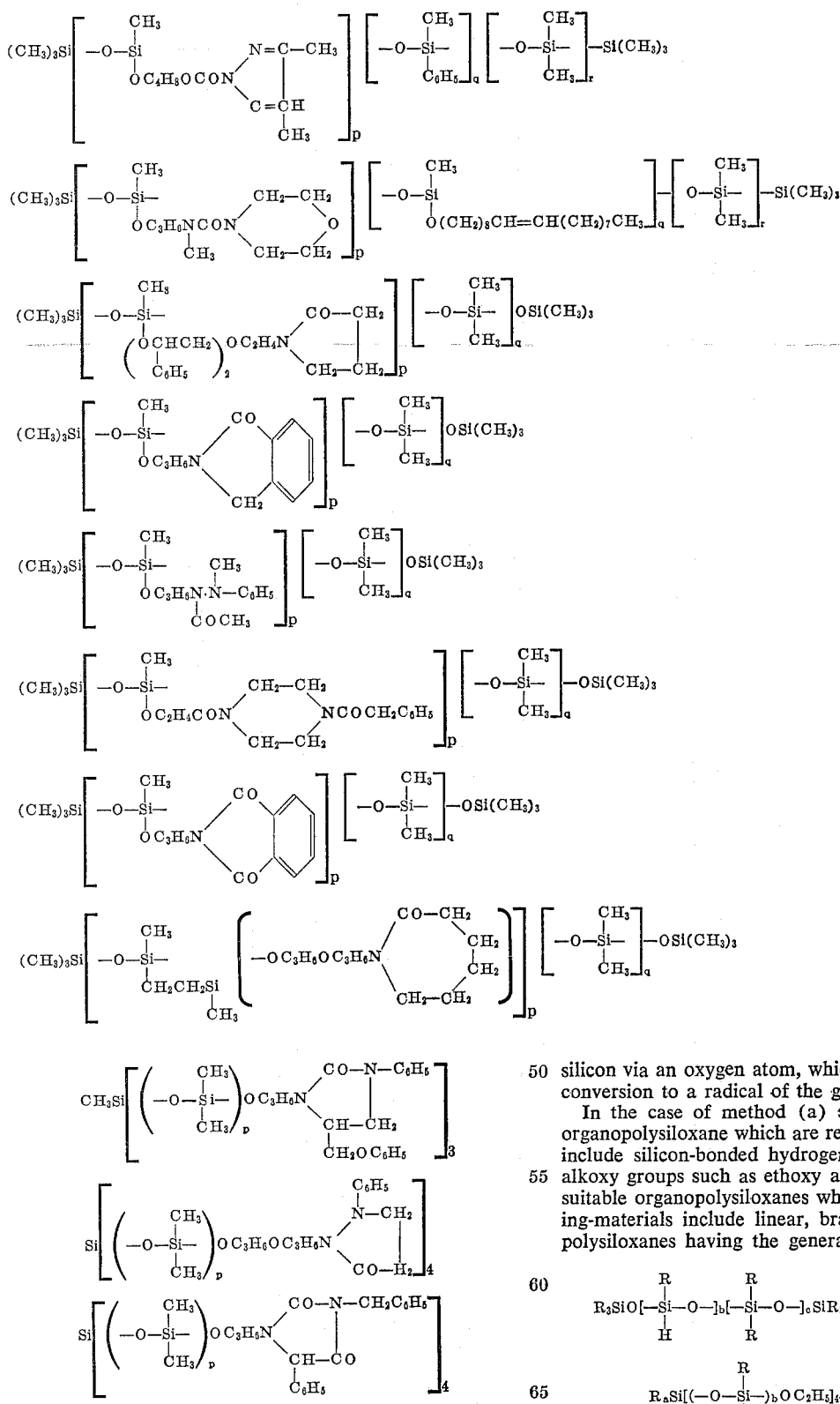

wherein p, q and r are integers.

The organopolysiloxanes of the present invention may conveniently be made by many of the methods known for the manufacture of polysiloxanes. Two preferred general methods which may be used for the introduction of the groups OX, include (a) reaction of an organopolysiloxane containing at least one grouping which is reactive to hydroxyl groups with an alcohol of the general formulae XOH, (b) suitable reaction of an organopolysiloxane which already contains a grouping attached to silicon via an oxygen atom, which grouping is capable of conversion to a radical of the general formula X.

In the case of method (a) suitable groupings in the organopolysiloxane which are reactive to hydroxyl groups include silicon-bonded hydrogen or halogen, and lower alkoxy groups such as ethoxy attached to silicon. Thus, suitable organopolysiloxanes which may be used as starting-materials include linear, branched or cyclic organopolysiloxanes having the general formulae:

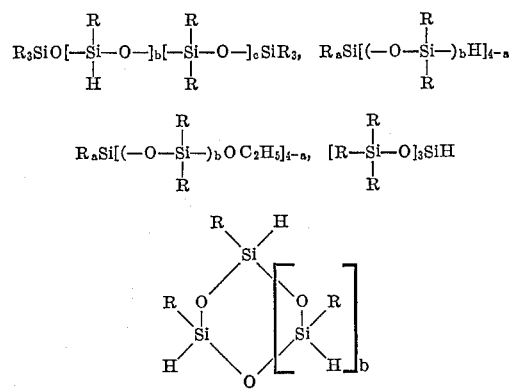

and

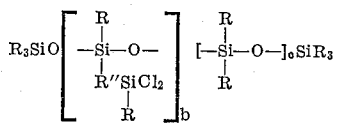

wherein b and c are integers, a is an integer of from 2 to 4, R is a hydrocarbon residue which is preferably methyl or may be at least in part, as desired, a lyophilic hydrocarbon group as before defined, and R" is a divalent hydrocarbon residue which is preferably ethylene or trimethylene.

As particularly useful polysiloxane starting materials there may be mentioned random copolymers having the general formula:

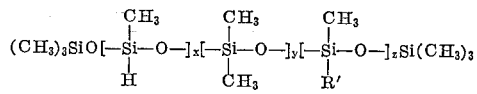

wherein $x+y+z$ is between 10 and 50, $x$ is at least 3 and is preferably not more than $$\frac{x+y+z}{2}$$

$z$ is between 0 and $x$, and R' is a lyophilic hydrocarbon residue such as octyl, cyclohexyl, phenyl, benzyl, or phenylethyl.

These polysiloxane starting materials may be prepared by known methods, for example by cohydrolysis or equilibration processes from known appropriate intermediates.

As another particularly useful class of polysiloxane starting materials there may be mentioned random copolymers having the general formula:

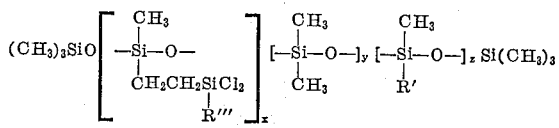

wherein $x$, $y$ and $z$ are as above defined, R' is a lyophilic residue and R''' is methyl or chlorine.

They may be made from the previously-described polysiloxane starting materials containing silicon-bonded hydrogen by reaction with vinyltrichlorsilane or vinylmethyldichlorsilane in presence of catalysts.

Suitable alcohols of the formula XOH will be apparent from the examples of the organic radical X given hereinbefore and include for example—

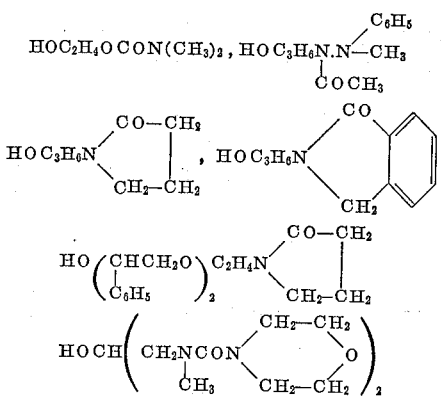

Where it is desired to have a lyophilic group or groups present in the organopolysiloxane molecule in addition to or in place of lyophilic groups derived from the polysiloxane starting-material or from the alcohol XOH, these may for example be introduced together with the radical X by reacting an alcohol containing the lyophilic group with the polysiloxane containing groups reactive to hydroxyl, in admixture with the alcohol XOH.

Examples of suitable alcohols containing a lyophilic group include phenylethyl alcohol, α-methyl benzyl alcohol, β - phenoxyisopropanol, 1,3-diphenoxyisopropanol, oleyl alcohol, isooctanol and dipropylene glycol monoisooctyl ether.

Where the polysiloxane starting material contains silicon-bonded hydrogen atoms, lyophilic groups may also be introduced by reaction with an unsaturated organic compound containing $>C=C<$ linkage and a lyophilic group. Thus some of the silicon-bonded hydrogen atoms in the polysiloxane molecule may be reacted with an unsaturated compound containing a lyophilic group and the remaining silicon-bonded hydrogen atoms subsequently reacted with an alcohol XOH.

Examples of suitable unsaturated compounds containing a lyophilic group include styrene, α-methylstyrene, vinyl toluene, diisobutene, octadecene-1, vinyl isooctyl ether, allyl isooctyl ether, allyl phenyl ether, and benzyl acrylate.

The reaction of a polysiloxane containing silicon-bonded hydrogen with an alcohol is preferably carried out in the presence of a catalyst of the type described in the prior art as effective in this type of reaction, for example bases, acids, Friedel-Crafts halides or metallic salts and complexes. It has been found that satisfactory results are achieved using as catalysts certain metal salts, especially metal salts which are soluble in the reaction medium such as carboxylic acid salts of divalent tin or lead, or of dialkyl tin. Examples of particularly suitable catalysts are stannous octoate, lead octoate and dibutyl tin dilaurate. The catalysts are normally used in proportions of from 0.05 to 1.0% by weight of the total weight of reactants although proportions outside this range may be used.

The reaction is normally carried out at temperatures of from 20° C. to 140° C. dependent mainly on the catalyst used. It is usually convenient to carry out the reaction in a solvent for example an aromatic hydrocarbon or a chlorinated aromatic hydrocarbon.

The reaction of a polysiloxane containing silicon-bonded hydrogen with an unsaturated compound containing $>C=C<$ linkage may be conveniently carried out in the presence of a catalyst, usually platinum or a compound of platinum, for example chloroplatinic acid or a platinous chloride-cyclohexene complex. Other prior art catalysts may also be employed.

The reaction of a polysiloxane containing silicon-bonded halogen with an alcohol is conveniently carried out in the presence of an acid-binding agent, for example a tertiary amine such as pyridine.

The reaction of a polysiloxane containing lower alkoxy groups attached to silicon with an alcohol may be conveniently carried out in the presence of catalysts such as trifluoroacetic acid or dibutyltin dilaurate; other prior art catalysts may also be used. It is usually preferred to carry out the reaction in a mutual solvent for the reactants, for example an aromatic hydrocarbon or chlorinated aromatic hydrocarbon. Since the reaction is reversible it is preferred to carry out the reaction under conditions such that the lower alkanol which is formed as a by-product may be removed by distillation.

For preparation by (b) there may be used for example an organopolysiloxane containing a secondary amino group contained in an organic radical attached to a silicon atom through an oxygen atom. The said amine group may be reacted with a carboxylic acid chloride, a chloroformic ester, or a carbamyl chloride to yield an amide, carbamate or urea group. Many other ways of using similar synthetic organic chemical methods for introducing an organic radical containing the group

into an organopolysiloxane by method (b) will be easily worked out by anyone skilled in the art.

The organopolysiloxanes of the present invention have valuable properties of use in the field of surface active chemistry and are useful as emulsifying agents, dispersing agents, mould release agents and antistatic agents.

They are particularly useful as surfactant additives for use in the manufacture of polyurethane foam.

The invention is illustrated but not limited by the following examples in which all parts and percentages are by weight—

*Example 1*

A mixture of 34 parts of hydroxyethyl N,N-dimethylcarbamate and 62 parts of toluene is dried by azeotropic distillation with return of solvent to the mixture. After cooling to 90° C. there is then added, with stirring, 0.6 of a part of stannous octoate followed by 38.2 parts of a linear polysiloxane having approximately the average structure—

$$(CH_3)_3Si(OSiHCH_3)_9(OSi(CH_3)_2)_9OSi(CH_3)_3$$

in which the methylsilyl and dimethylsilyl groups are randomly disposed along the chain and the active hydrogen content is 0.655%. The addition is carried out over about 2 hours with the temperature maintained at 90–100° C. Hydrogen is evolved during the addition. When addition is complete, the mixture is heated to its boiling point over about 20 minutes and refluxed for 16 hours. A test portion treated with sodium methoxide then shows no further effervescence, indicating that reaction is complete. The solvent is now removed by distillation under vacuum and the slightly turbid liquid residue, after cooling, is filtered with the aid of a siliceous earth. The product is a clear, mobile oil which consists essentially of a random copolymer having the average structure—

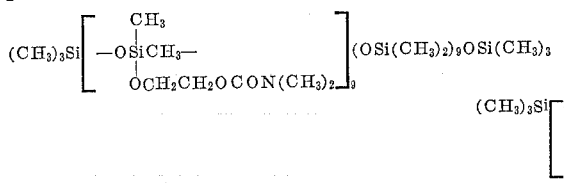

The infra-red spectrum is consistent with this structure and shows the absence of any peaks associated with hydroxyl or silicon-bonded hydrogen. The product is insoluble in water although soluble in propylene oxide polymers.

*Example 2*

A mixture comprising 30.5 parts of the polysiloxane as used in Example 1, 11.6 parts of styrene, 35 parts of dry toluene and 0.01 of a part of cyclohexene-platinous chloride complex, is heated with stirring to its boiling-point over about 1½ hours in an atmosphere of dry nitrogen, refluxed for 2 hours and then cooled to 25° C. There is then added a solution of 13 parts of 1-(2-hydroxypropyl)-2-pyrrolidone in 22 parts of toluene which has been dried by azeotropic distillation, followed by 0.25 of a part of stannous octoate and the mixture is again heated to its boiling-point in about 1½ hours. Hydrogen is evolved during this second stage of the reaction. The mixture is refluxed for 16 hours. A test portion treated with a solution of sodium butoxide in n-butanol shows no effervescence, indicating the absence of Si—H groups. After cooling, the dark-coloured solution is filtered with the aid of a siliceous earth and the solvent then removed by distillation under vacuum. The residue is a clear, yellow, viscous syrup consisting essentially of a random copolymer having the average structure—

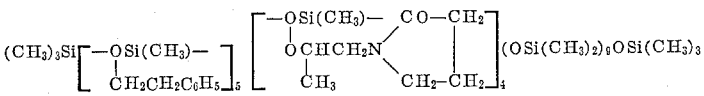

The infra-red spectrum is consistent with this structure. The product is insoluble in water although soluble in propylene oxide polymers.

*Example 3*

A mixture of 24.3 parts of 1-(2-hydroxypropyl)-2-pyrrolidone, 21.8 parts of an oxypropylation product of a commercial grade of isooctanol having an average molecular weight of 256.5, and 70 parts of toluene, is prepared in an atmosphere of dry nitrogen and then dried azeotropically. After cooling to 90° C. there is added with stirring 0.6 of a part of stannous octoate, followed by 38.2 parts of the polysiloxane as used in Example 1. The addition of the polysiloxane is carried out over about 2 hours with the temperature maintained at 90–95° C. When addition is complete, the mixture is heated to its boiling-point over about 15 minutes and then refluxed for 16 hours. The completion of reaction is shown by treating a test portion with sodium methoxide, when no further effervescence occurs. The solvent is removed by distillation under vacuum and the slightly turbid liquid residue clarified, after cooling, by filtration with the aid of a siliceous earth. The product is a clear, pale yellow, moderately viscous syrup which consists essentially of a random copolymer having the average structure—

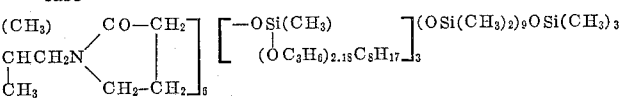

The product is insoluble in water but soluble in propylene oxide polymers.

*Example 4*

The process of Example 3 is repeated using 10.4 parts of phenylmethylcarbinol in place of 21.8 parts of oxypropylated isooctanol. There is thus obtained a random copolymer having the average structure—

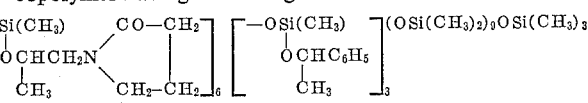

The product is similarly a clear, pale yellow, fairly viscous syrup which is insoluble in water but soluble in propylene oxide polymers.

*Example 5*

The process of Example 1 is repeated using 41.4 parts of 2-hydroxy-1-methylpropyl 4-morpholinecarboxylic ester and 30.5 parts of the same polysiloxane as used in Example 1. There is thus obtained a random copolymer having the average structure—

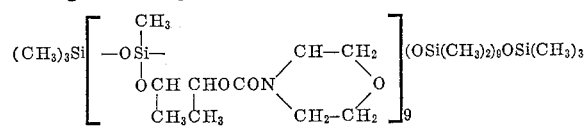

The product is a clear, faintly yellow, fairly viscous syrup which is insoluble in water but soluble in propylene oxide polymers.

*Example 6*

The process of Example 1 is repeated using 46.7 parts of 2-ethyl-N-ethyl-N-(2-hydroxypropyl)-hexanamide, 170 parts of toluene, 0.2 of a part of stannous octoate, and 45.4 parts of a random polysiloxane having approximately the average structure—

$$(CH_3)_3Si(OSiHCH_3)_6(OSiCH_3)_2)_{12}OSi(CH_3)_3$$

and with a viscosity of 10.4 centistokes at 25° C. and an active hydrogen content of 0.44%. There is thus obtained a liquid random copolymer having the average structure—

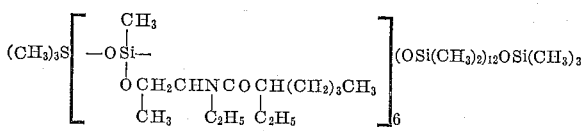

Example 7

The process of Example 1 is repeated using 47.7 parts of 1-(2-hydroxypropyl)-2-pyrrolidone and 23.0 parts of a linear polysiloxane having approximately the average structure—

$$(CH_3)_3Si(OSiHCH_3)_{25}OSi(CH_3)_3$$

and with an active hydrogen content of 1.448%. There is thus obtained a substituted polysiloxane having approximately the average structure—

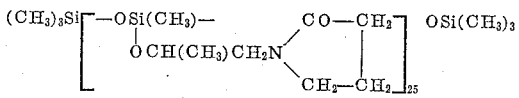

The product is a very viscous, pinkish syrup which exhibits the interesting property of inverse solubility in water, in that it is readily miscible with cold water but tends to come out of solution on warming.

Example 8

The process of Example 1 is repeated using 28.8 parts of an oxypropylation product of 1-(2-hydroxyethyl)-2-pyrrolidone having a hydroxyl value of 292 mg. KOH/g. and 34.0 parts of the same polysiloxane as used in Example 6. There is thus obtained a random copolymer having the average structure—

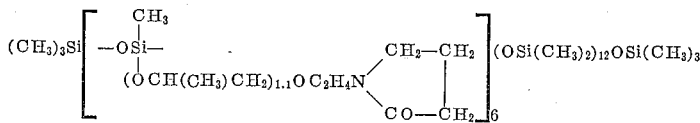

The product is a clear, straw-coloured oil, viscosity 1.5 poises at 25° C. insoluble in water but readily soluble in propylene oxide polymers.

Example 9

The process of Example 1 is repeated using 33.5 parts of an oxypropylation product of 1-(2-hydroxyethyl)-2-pyrrolidone having a hydroxyl value of 171.2 mg. KOH/g., 0.2 of a part of stannous octoate and 50.0 parts of a random polysiloxane having approximately the average structure:

$$(CH_3)_3Si(OSiHCH_3)_3(OSi(CH_3)_2)_{15}OSi(CH_3)_3$$

and an active hydrogen content of 0.20%. There is thus obtained a clear, pale yellow, liquid random copolymer having a viscosity of 2.0 poises at 25° C. and having the average structure—

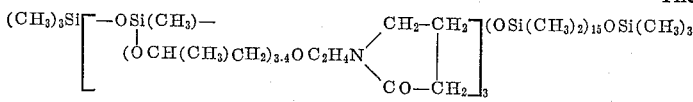

Example 10

The process of Example 1 is repeated using 50.2 parts of an oxypropylation product of 1-(2-hydroxyethyl)-2-pyrrolidone having a hydroxyl value of 171.2 mg. KOH/g., 0.3 of a part of stannous octoate and 34.0 parts of the same polysiloxane as used in Example 6. There is thus obtained a random copolymer having the average structure—

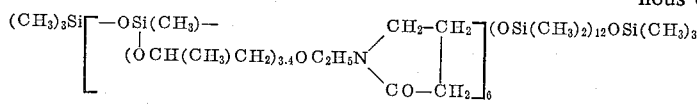

The product is a clear, straw-coloured oil, viscosity 5.0 poises at 25° C., insoluble in water but readily soluble in propylene oxide polymers.

Example 11

The process of Example 1 is repeated using 25.6 parts of a reaction product of 1-(2-hydroxyethyl)-2-pyrrolidone with styrene oxide having a hydroxyl value of 225 mg. KOH/g., 0.3 of a part of stannous octoate and 24.2 parts of a random polysiloxane having approximately the average structure:

$$(CH_3)_3Si(OSiH(CH_3))_{12}(OSi(CH_3)_2)_{26}OSi(CH_3)_3$$

and an active hydrogen content of 0.412%. There is thus obtained a random copolymer having the average structure—

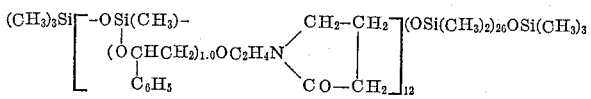

The product is a clear, straw-coloured oil having a viscosity of 10 poises at 25° C., sparingly soluble in cold water and readily soluble in propylene oxide polymers.

Example 12

The process of Example 1 is repeated using 20.5 parts of an oxypropylation product of ε-caprolactam having a hydroxyl value of 288 mg. KOH/g., 0.2 of a part of stannous octoate and 22.7 parts of the same polysiloxane as used in Example 6. There is thus obtained a random copolymer having the average structure—

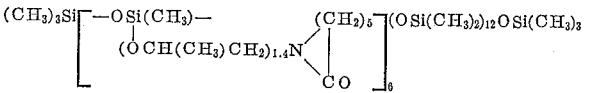

The product is a clear, pale brown oil, viscosity 9 poises at 25° C., insoluble in water but readily soluble in propylene oxide polymers.

Example 13

The process of Example 1 is repeated using 19.7 parts of 1-(2-hydroxypropyl)-phthalimidine, 0.2 of a part of stannous octoate and 24.2 parts of the same polysiloxane as used in Example 11. There is thus obtained a random copolymer having the formula—

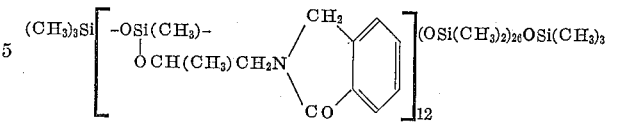

The product is a clear, pale straw-coloured oil, viscosity 50 poises at 25° C. insoluble in water but readily soluble in propylene oxide polymers.

Example 14

The process of Example 1 is repeated using 21.0 parts of an oxypropylation product of 5,5-dimethylhydantoin having a molecular weight of 204, 0.2 of a part of stannous octoate and 22.7 parts of the same polysiloxane as used in Example 6. There is thus obtained a random copolymer having the average structure—

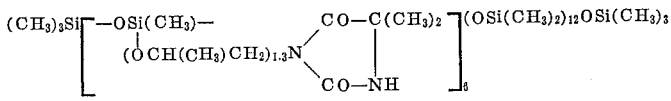

The product is a clear, pale straw-coloured viscous syrup, insoluble in water but soluble in propylene oxide polymers.

*Example 15*

The process of Example 1 is repeated using 20.5 parts of 1-(2-hydroxyethyl)-2-iminazolidone (nitrogen content by analysis equal to the calculated theory of 21.5%), 0.3 of a part of stannous octoate and 34.0 parts of the same polysiloxane as used in Example 6. There is thus obtained a random copolymer having the average structure—

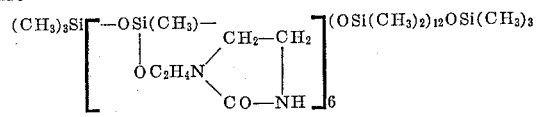

The product is a clear, pale straw-coloured, viscous syrup, insoluble in water but soluble in propylene oxide polymers.

*Example 16*

The process of Example 1 is repeated using 40.8 parts of an oxypropylation product of 1-phenyl-3-pyrazolidone having a molecular weight of 259, 0.3 of a part of stannous octoate and 34.0 parts of the same polysiloxane as used in Example 6. There is thus obtained a random copolymer having the average structure—

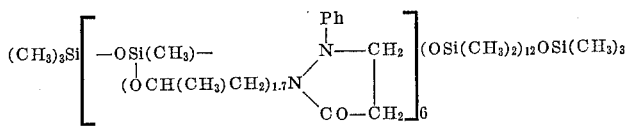

The product is a clear, straw-coloured viscous syrup, insoluble in water but soluble in propylene oxide polymers.

*Example 17*

The process of Example 1 is repeated using 21.3 parts of an oxypropylation product from 4-(4-morpholinocarbonyl)-1-(2-hydroxypropyl)-2-pyrrolidone having a hydroxyl value of 173 mg./KOH/g., 60 parts of toluene, 0.2 of a part of stannous octoate, and 14.2 parts of the polysiloxane used in Example 6. There is thus obtained a random copolymer having substantially the average structure—

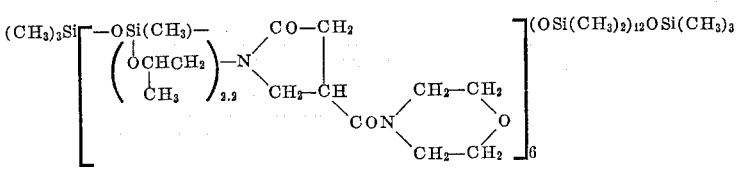

The product is a viscous syrup which readily disperses and then dissolves, in propylene oxide polymers. It is miscible with a small amount of water at about 0° C. but tends to come out of solution on warming or on dilution with more water.

The 4-(4-morpholinocarbonyl)-1-(2-hydroxypropyl)-2-pyrrolidone is made by first reacting equimolar proportions of isopropanolamine and itaconic acid in boiling aqueous solution to form 1-(2-hydroxypropyl)-2-pyrrolidone-4-carboxylic acid, and then heating the acid with an excess of morpholine to form the corresponding morpholide.

*Example 18*

A mixture of 19.7 parts of dry 1-(2-hydroxypropyl)-2-pyrrolidone, 16 parts of dry pyridine and 50 parts by volume of dry toluene is added during 1 hour to a mixture of 33.5 parts of a reaction product of the same polysiloxane as used in Example 9 with vinylmethyldichlorosilane having a hydrolysable chlorine content of 10.9% and having approximately the average structure—

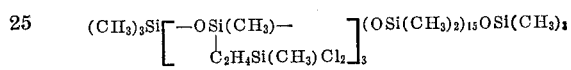

and 50 parts by volume of dry toluene whilst stirring at 40–45° C. in an atmosphere of pure nitrogen. The temperature is then raised to 95° C. and held at 95–100° C. for 16 hours.

The white crystalline precipitate of pyridine hydrochloride is filtered off hot and the toluene and excess pyridine are removed by vacuum distillation. After stirring with 2 parts of activated carbon and filtered through a pad of siliceous earth there is obtained a random copolymer having the average structure—

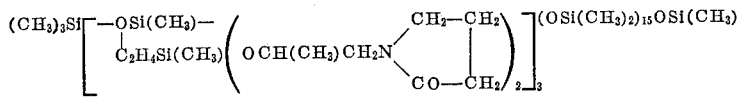

The product is a clear, almost colourless oil, viscosity 4 poises at 25° C., quite soluble in cold water, sparingly soluble in warm water and readily soluble in propylene oxide polymers.

*Example 19*

The process of Example 18 is repeated using 21.1 parts of 1-(2-hydroxypropyl)phthalimide and 21.2 parts of reaction product from the same polysiloxane as used in Example 9 with vinyltrichlorosilane having a hydrolysable chlorine content of 16.5% and having approximately the average structure—

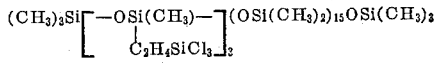

There is thus obtained a random copolymer having the average structure—

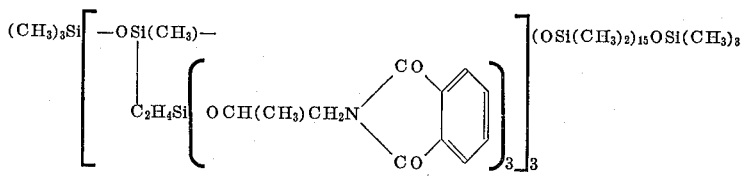

The product is a clear, almost colourless, viscous syrup, insoluble in water but soluble in propylene oxide polymers.

What we claim is:

1. Non-ionic organopolysiloxanes selected from the group consisting of:

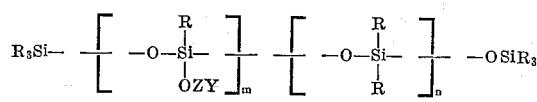

and

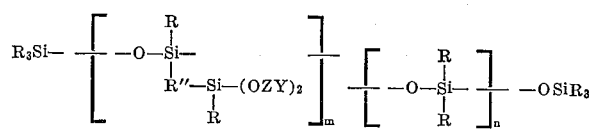

wherein R and R' are lower alkyl radicals, $m$ is a positive integer, $n$ is zero or a positive integer, and the sum of $m$ and $n$ lies between 10 and 50, Y represents the group

wherein each of the atoms attached to the nitrogen atom in the group

is a member of the group selected from C and N, Z stands for an organic divalent radical selected from the group consisting of lower alkylene, oxy-lower alkylene, lower alkylene ether and lower polyalkylene ether, and R" represents lower alkylene radicals.

2. Non-ionic organopolysiloxane as claimed in claim 1 wherein the

group forms part of a radical selected from the group consisting of amide, imide, carbamate, hydrozide and urea radicals.

3. Non-ionic organopolysiloxanes as claimed in claim 2 having the general formula:

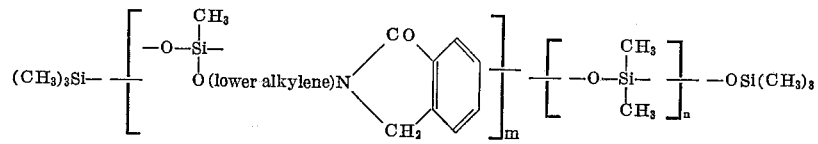

$m$ is a positive integer, $n$ is zero or a positive integer, and the sum of $m$ and $n$ lies between 10 and 50.

4. A non-ionic organopolysiloxane as claimed in claim 3 having the formula:

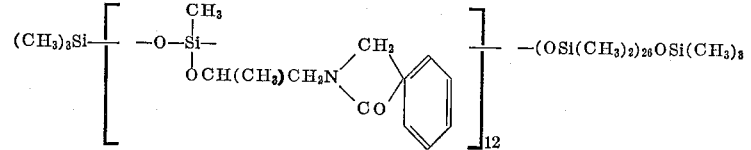

5. An organopolysiloxane as claimed in claim 3 having the formula:

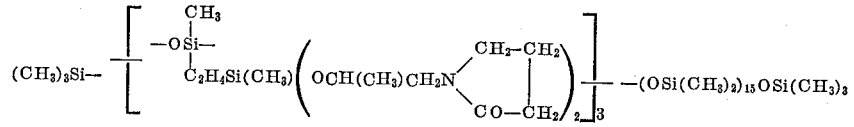

6. Non-ionic organopolysiloxanes as claimed in claim 1 wherein the organopolysiloxanes are selected from the group consisting of:

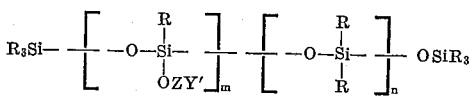

and

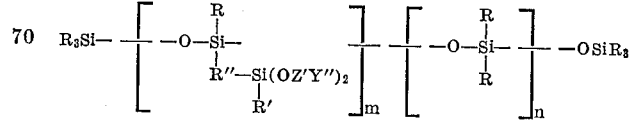

wherein R and R' are lower alkyl radicals, $m$ is a positive integer, $n$ is zero or a positive integer, and the sum of $m$ and $n$ lies between 10 and 50, Y' is an amido group in which the nitrogen atom forms part of a heterocyclic ring, Y'' represents a heterocyclic radical having an amido group forming part of the heterocyclic ring and linked to Z' through the nitrogen atom of the amido group, Z stands for an organic divalent radical selected from the group consisting of lower alkylene, oxy-lower alkylene, lower alkylene ether and lower polyalkylene ether, and R'' and Z' represent lower alkylene radicals.

7. Non-ionic organopolysiloxanes as claimed in claim 6 having the general formula:

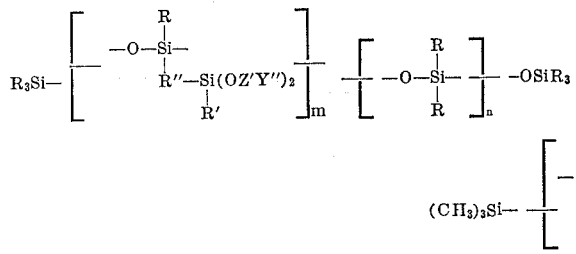

wherein R and R' represent lower alkyl, R'' and Z' represent lower alkylene, and Y represents a heterocyclic radical having an amido group forming part of the heterocyclic ring and linked to Z' through the nitrogen atom of the amido group, $m$ is a positive integer, $n$ is zero or a positive integer, and the sum of $m$ and $n$ lies between 10 and 50.

8. Non-ionic organopolysiloxanes as claimed in claim 6 having the general formula:

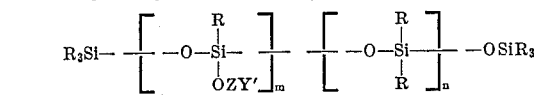

wherein R represents a lower alkyl radical, $m$ is a positive integer, $n$ is zero or a positive integer, and the sum of $m$ and $n$ lies between 10 and 50, Z represents an organic divalent radical selected from the group consisting of lower alkylene, oxy-lower alkylene, lower alkylene ether and lower polyalkylene ether and Y' represents an amido group in which the nitrogen atom forms part of a heterocyclic ring.

9. Non-ionic organopolysiloxanes as claimed in claim 8 having the general formula:

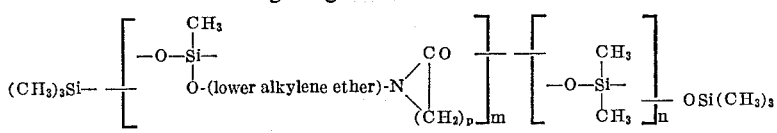

wherein $p$ has an integral value of from 3 to 5, $m$ is a positive integer, $n$ is zero or a positive integer, and the sum of $m$ and $n$ lies between 10 and 50.

10. A non-ionic organopolysiloxane as claimed in claim 9 having the formula:

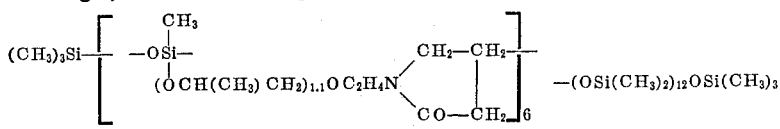

References Cited by the Examiner

UNITED STATES PATENTS

| | | | |
|---|---|---|---|
| 2,902,468 | 9/1959 | Fianu | 260—46.5 |
| 3,068,152 | 12/1962 | Black | 167—90 |
| 3,179,622 | 4/1965 | Haluska | 260—46.5 |
| 3,179,713 | 4/1965 | Brown | 260—46.5 |

LEON J. BERCOVITZ, *Primary Examiner.*

F. McKELVEY, *Assistant Examiner.*